United States Patent
Visagie (10) Patent No.: US 6,475,082 B2
(45) Date of Patent: Nov. 5, 2002

(54) FLAP OPENINGS IN A GRAIN HARVESTING THRESHING AND SEPARATION UNIT

(75) Inventor: Andrie Diederich Visagie, Bothaville (ZA)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/758,560

(22) Filed: Jan. 11, 2001

(65) Prior Publication Data

US 2001/0002367 A1 May 31, 2001

Related U.S. Application Data

(63) Continuation-in-part of application No. 09/125,348, filed on Aug. 18, 1998, now Pat. No. 6,176,778.

(30) Foreign Application Priority Data

Jul. 31, 2000 (EP) .................................. PCT/EP00/07373

(51) Int. Cl.[7] .......................... A01F 11/06; A23N 5/00; B02B 3/00
(52) U.S. Cl. ............................................ 460/45; 460/66
(58) Field of Search ............................. 460/66, 5, 101, 460/100, 99, 102, 45–46, 94, 95, 4; 56/14.6; 73/865.9

(56) References Cited

U.S. PATENT DOCUMENTS

| | | |
|---|---|---|
| 1,850,279 A | 3/1932 | Dieterich |
| 2,210,821 A | 8/1940 | Sharp |
| 2,222,282 A | 11/1940 | Court |
| 2,271,897 A | 2/1942 | Mast |
| 2,344,235 A | 3/1944 | Crumb et al. |
| 2,484,999 A | 10/1949 | Hyman |
| 2,849,118 A * | 8/1958 | Ashton ........................ 209/318 |
| 3,021,009 A * | 2/1962 | Scott ........................... 209/394 |
| 3,348,780 A | 10/1967 | Barkstrom et al. |
| 3,401,727 A | 9/1968 | Blanshine et al. |
| 3,401,729 A | 9/1968 | Wallin et al. |
| 3,472,378 A * | 10/1969 | Payne ......................... 209/394 |
| 3,536,077 A | 10/1970 | Stott et al. |
| 3,645,270 A * | 2/1972 | Rowland-Hill ............... 460/69 |
| 3,844,293 A | 10/1974 | Young |
| 4,036,065 A * | 7/1977 | Strelioff et al. ............ 73/865.9 |
| 4,353,376 A * | 10/1982 | Schuler ....................... 460/67 |
| 4,497,327 A * | 2/1985 | Hug et al. ................... 460/67 |
| 4,502,493 A * | 3/1985 | Jones et al. ................ 460/101 |
| 4,712,568 A * | 12/1987 | Strong et al. ................ 460/69 |
| 4,897,072 A * | 1/1990 | Bestland ...................... 460/99 |
| 4,906,219 A * | 3/1990 | Matousek et al. ............ 460/98 |
| 5,017,177 A | 5/1991 | Mitkov et al. |
| 5,041,059 A * | 8/1991 | Ricketts et al. ............. 460/101 |
| 5,525,108 A * | 6/1996 | Rouse et al. ................ 460/101 |
| 5,527,219 A * | 6/1996 | Schumacher et al. ....... 460/101 |

FOREIGN PATENT DOCUMENTS

WO    WO 97/29628    8/1997

* cited by examiner

Primary Examiner—Robert E. Pezzuto
Assistant Examiner—Árpád Fab Kovács
(74) Attorney, Agent, or Firm—Husch & Eppenberger, LLC; Robert E. Muir; Richard J. Musgrave (57) ABSTRACT

A rotary threshing and separation unit for grain harvesting comprising a rotor housing with a feeding zone, separation zone and discharge zone, sieve at least partially located within the separation zone, rotary driven separation rotor arranged in the rotor housing, fan or blower for generating a main air flow stream moving through at least the separation zone and discharge zone, an auxiliary flow stream, adjustable flaps and grain collecting element arranged below the sieve.

20 Claims, 4 Drawing Sheets

FLAP OPENINGS IN A GRAIN HARVESTING THRESHING AND SEPARATION UNIT

APPLICATION CROSS-REFERENCES

This application is a continuation-in-part of U.S. application Ser. No. 09/125,348, filed Aug. 18, 1998 and now U.S. Pat. No. 6,126,778. This application also claims priority of PCT Application No. PCT/EP00/07373, filed Jul. 31, 2000, and which named the United States as a designated country.

FIELD OF THE INVENTION

This invention relates to the threshing, separating and cleaning of harvested grain. It relates more specifically to a harvesting apparatus.

It is envisaged that the invention will find application in the field of threshing of grain like maize (corn), wheat, beans, and the like, more particularly in the field of harvesting grain having lightweight or small, or both lightweight and small grain kernels such as wheat.

For purposes of this specification, the term "threshing" (and derivatives thereof) should be interpreted as including threshing, separating and cleaning (and corresponding derivatives thereof).

BACKGROUND OF THE INVENTION

Combine harvesters use rotary threshing and separation units to harvest grain like maize, wheat, beans and the like (hereinafter "grain"). To thresh grain, it is required to separate the grain from the ears, pods and the like. After separating the grain from the ears, pods and the like, grain must be separated from the chaff, broken straw, debris and the like (hereinafter "chaff"). A fan or blower is used for this purpose whereby the fan produces an air flow stream that carries off or separates chaff from the grain. The chaff is carried off or separated from the grain because the chaff is lighter in weight than the grain. It is apparent that the air flow stream is crucial in the process of separating the grain from the chaff.

Grain harvesting threshing and separation units work satisfactory in dry conditions and when harvesting maize. Under these conditions, the fan or blower is able to provide sufficient suction to move air through the rotor housing itself and through the sieve openings into the space between the sieve and the grain collecting element to move grain kernels. However, in humid conditions or when harvesting different grains like wheat, barley, rice or other crops, clogging may occur in the rotor housing or in the space between the sieve and the grain collecting element. Grain loss increases in such conditions, and the cleaning grade of the grain might deteriorate. This occurs because the suction from the fan or blower at the end of the rotor housing is inadequate under these conditions. Unfortunately because the suction is inadequate, the sieve openings clog and grain kernels cannot pass. This limits the performance and throughput of the combine grain harvesting threshing and separation unit's cleaning device.

The present invention is directed to overcoming one or more of the problems set forth above.

SUMMARY OF THE INVENTION

An aspect of the invention is to improve the performance of the rotary threshing and separation unit in extreme conditions.

In another aspect of the invention there is provided a device to improve performance of the rotary threshing and separation unit by creating an air flow stream in at least the separation zone between the sieve and grain collector element thereby preventing the openings in the sieve from getting clogged with chaff.

In another aspect of the invention there is provided at least one opening to allow an air flow stream between the sieve and grain collection element to improve the functioning of the rotary threshing and separation unit In another aspect of the invention there is provided openings in the sieve to achieve a sufficient air flow stream into the rotor housing.

In another aspect of the invention there are openings arranged to allow an air flow stream to flow in a cross or counter flow direction with respect to the feeding direction of the grain between the sieve and the grain collecting element thereby improving the separation of chaff from the grain by moving or carrying away the chaff because of its lighter weight with respect to the grain kernels.

In still another aspect of the invention there are flaps wherein air flow streams may pass to facilitate the separation of chaff and grain kernels and wherein the opening widths of said flaps are manually or automatically adjusted depending on the desired air flow stream speed and intensity that may be dependent upon the crop to be harvested, throughput desired and the other working conditions.

In still another aspect of the invention there are grain loss sensor senses located at the discharge end of the rotor housing that transmits signals to an electronic controller that computes a setting value for the drives of said flaps, and wherein the drives control the widths of the openings of the flaps thereby allowing for an automatic adjustment.

In still another aspect of the invention there is a fan or blower having a rotational speed and throughput capacity that is adjustable or variable to vary of control the speed of the air flow stream wherein said adjustment is dependent upon the crop to be harvested, desired throughput and other harvesting conditions.

In another aspect of the invention there is provided a second fan or blower for generating an auxiliary air flow stream between the sieve and the grain collector element.

In another aspect of the invention there are openings arranged to allow an air flow stream in a cross or counter flow to the feeding direction of the grain moving between the sieve and grain collecting element.

In yet another aspect of the invention there is an inexpensive and simple embodiment having one fan or blower to produce both a main air flow stream and auxiliary air flow stream.

The advantages described above and hereinafter for the improved designs described in the subclaims for the first embodiment also apply for the improvements described in the subclaims for the second embodiment. Further, preferred embodiments of the invention are described in further subclaims. The above aspects are merely illustrative and should not be construed as all-inclusive.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
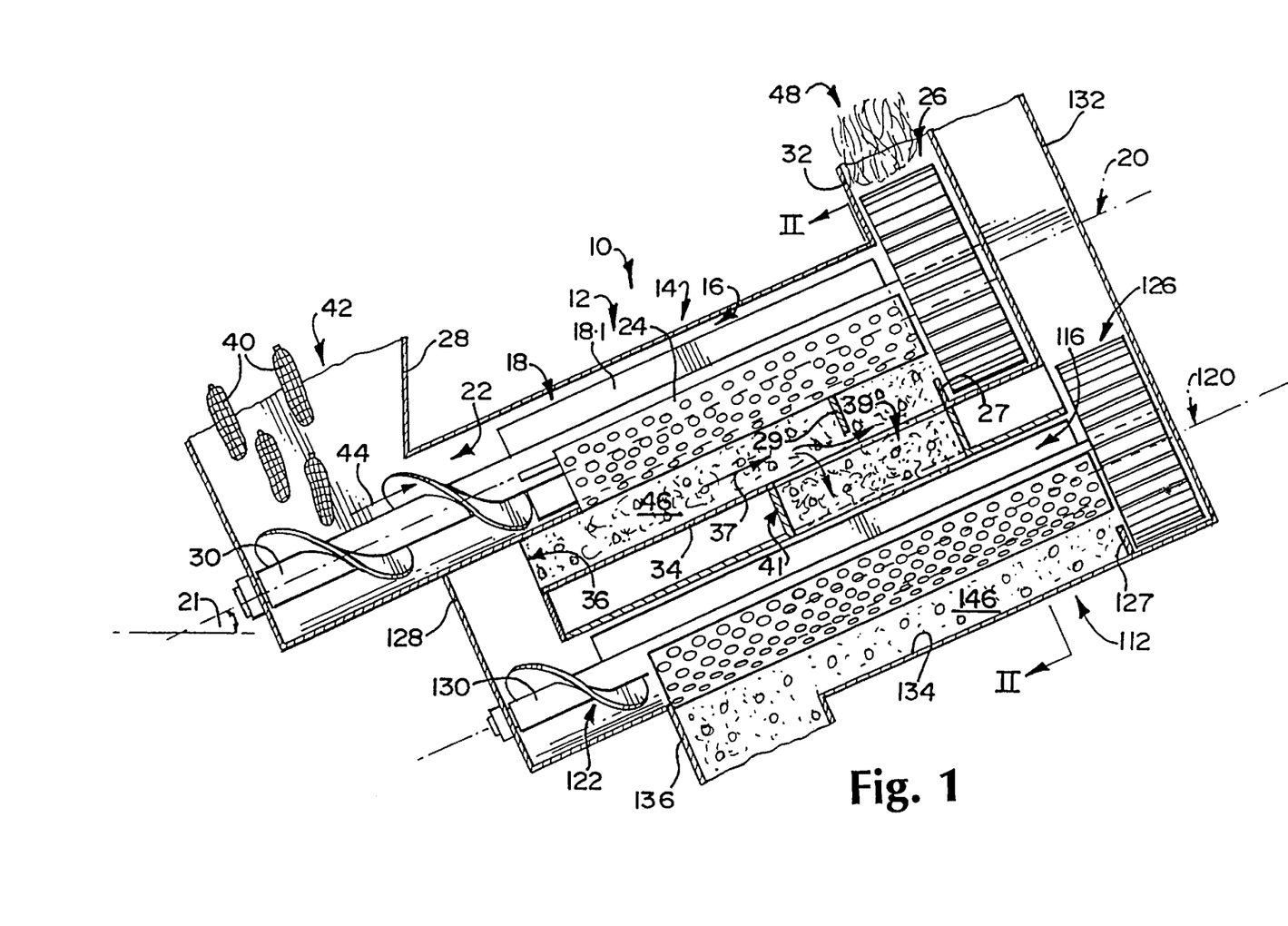
FIG. 1 is an axial sectional view illustrating the rotary threshing and separation unit.

With reference to FIG. 1, a rotary threshing and separation unit is generally indicated by reference numeral 10. The rotary threshing and separation unit 10 is a composite threshing apparatus having a first apparatus in the form of threshing apparatus generally indicated by reference numeral 12 and a second apparatus in the form of a cleaning apparatus generally indicated by reference numeral 112. The first 12 and second apparatus 112 are arranged to perform successive steps in the method of the invention i.e. they operate in series. The second apparatus 112 is arranged generally below the first apparatus 12.

The first threshing apparatus 12 comprises a generally round cylindrical casing generally indicated by reference numeral 14 and defining a threshing zone generally indicated by reference numeral 16 about a threshing axis 20. The threshing axis 20 is arranged, in this embodiment, at an angle 21, which is preferably between about 30° and about 45° from the horizontal.

The first threshing apparatus 12 includes a threshing means 18 operatively provided within the threshing zone 16.

Transport means 22, which is in the form of a screw conveyor or auger is arranged to transport harvested crop in the forms of ears, pods, or the like from a hopper 28 obliquely upwardly into the threshing zone 16. The screw conveyor 22 is conveniently co-axial with the axis 20.

A longitudinal boundary along a lower portion of the threshing zone 16 is defined by means of an arcuate, trough-like sieve 24 having perforations. The sieve 24 is arranged concentrically with the axis 20.

At one end, which is an upper end in use, of the threshing zone 16, there is provided a fan 26, co-axially with the threshing axis 20, to generate an air flow stream from the hopper 28, through the threshing zone, and to exhaust the air flow via outlet conduit 32. The fan 26 is of the centrifugal type and its inlet is thus on axis.

A common shaft or axle 30 acts as a tubular shaft over which flighting of the auger 22 is provided, and in series with the flighting, beater bars 18.1 of the threshing means are mounted on the shaft 30 to extend radially and longitudinally. Also the fan 26 is mounted on the shaft 30. In another embodiment, the fan 26 may be driven from the shaft 30 via a speed changing device.

Underneath the sieve 24, and generally parallel with the axis 20, there is provided a trough 34 which is, at its lower end, open as indicated at 36. The open end 36, in relation to the second apparatus 112, corresponds to or is analogous to the hopper 28 in relation to the first apparatus 12, and leads into transport means of the second cleaning apparatus 112.

Figure 2:
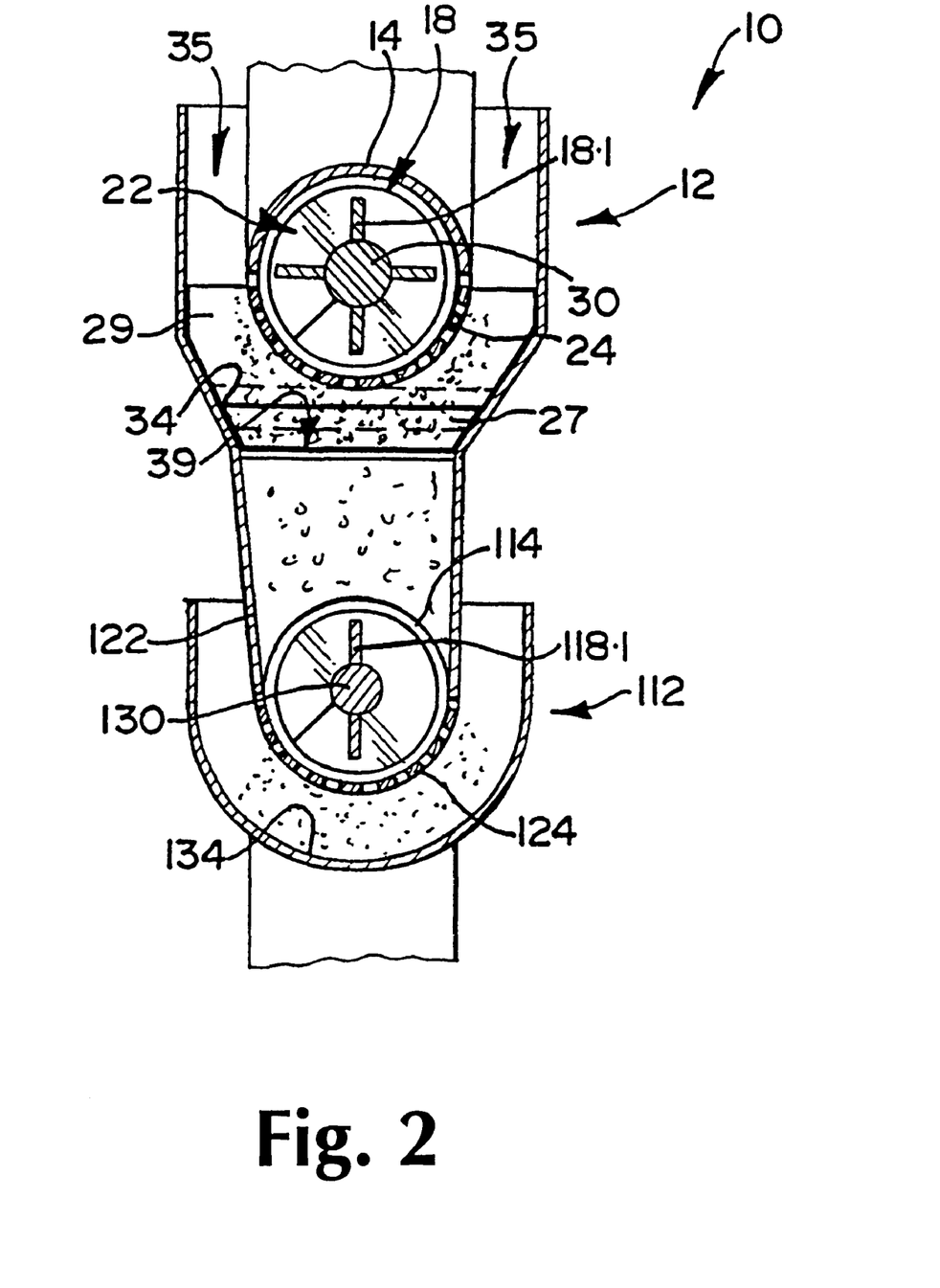
FIG. 2 is a sectional view taken at II—II in FIG. 1.

Air inlet openings 35, which are out of the plane of the section of FIG. 1 and which can be perceived from FIG. 2, allow air to be drawn via the trough 34 as shown at 37 into the fan 26. The inlet opening of the fan 26 is sufficiently large to have an influence outside the threshing zone 16. Air also flows via the opening between the trough 34 and the sieve 24 and via the openings in the sieve 24 to the central regions of the fan inlet. Such air flow lifts chaff off the sieve 24 and carries the chaff to the fan 26.

A volute for the fan 26 is formed partially by a transverse baffle 27 at an upper end of the trough 34. The baffle 27 is mounted on the trough and extends upwardly from the trough. The baffle 27 is easily replaceable, e.g. to adjust the height of the baffle 27. The baffle 27 provides a barrier to prevent grain, which because of the relatively high density of the baffle 27, is concentrated along the floor of the trough 34, from being drawn into the fan 26 and exhausted via conduit 32.

By way of development, a transverse intermediate baffle 29 is provided between the open end 36 and the baffle 27. The baffle 29 depends from the sieve 24. The baffle 29 can readily be replaced to vary, for example, height. The free ends of the baffles 27 and 29 preferably overlap when seen in axial projection. The upstream baffle 27 will deflect grain, which has become airborne to prevent such airborne grain from being drawn into the fan 26. Furthermore, the baffles 27, 29 cause the auxiliary air flow stream to become circuitous to be directed momentarily generally into an auxiliary grain exit 39, which will be described hereinafter. The baffle 29 is advantageously opposite to a center of the auxiliary grain exit 39.

It is to be appreciated that, because the sieve 24 and the trough 34 are merely arcuate or convex and not circular, the air flow stream 37 moves in a relatively narrow channel, thus making it more effective, alternatively requiring less air to be moved.

In use, harvested crops in the form of ears, pods, or the like fall under gravity into the hopper 28 to be transported obliquely upwardly as indicated at 44 into the threshing zone 16 by the transport means 22. In the threshing zone 16, the ears, pods or the like are threshed to liberate grain from chaff. The chaff in the threshing zone 16 is carried by the flow stream through the fan 26 to be exhausted via the conduit 32 as indicated at 48. The grain falls under gravity and under centrifugal force through the air flow stream onto the sieve 24. The apertures of the sieve are selected to pass liberated grain with clearance. Thus, liberated grain, with an amount of relatively small pieces of chaff, fall into the trough 34 as indicated by reference numeral 46. The small pieces of chaff are carried by the flow stream 37 along the trough 34.

In accordance with this embodiment, there is provided an aperture forming an auxiliary grain exit 39 (mentioned above) in the bottom of the trough 34 between the fan 26 and the open end 36. The baffle 27 may be at or proximate downstream extremity of the auxiliary grain exit 39. The auxiliary grain exit 39 leads via an internal chamber 41 to the second apparatus 112.

Thus, grain which may be carried in the air flow stream 37, because of the relatively heavy weight compared to the weight of the small pieces of chaff, will tend to be at a low level, i.e. concentrated near the bottom of the trough 34. A portion of the air flow stream carrying such concentrated grain flows via the auxiliary grain exit 39 and the chamber 41 (which will be relatively stagnant in respect of airflow) into the apparatus 112. The baffle 27 precludes grain from being carried by the air flow stream through the fan 26 to be exhausted via the conduit 32 while allowing the small pieces of chaff to exit via the fan 26 and the conduit 32.

The length of the grain exit may be between 25% and 75%, typically about 50% of the length of the trough 34, which is approximate in length to the sieve 24. The projected width of the grain exit may be about equal to the to the projected width of the sieve. The height of the chamber 41 may be about equal to the spacing between the sieve and the trough.

As mentioned above, interaction of the baffles 27, 29 and the auxiliary air flow stream causes the flow stream to become circuitous around the end of the baffle 29. Grain, carried in the auxiliary air flow stream and which will tend to progress tangentially on account of inertia as a result of relatively high density, will be directed generally into the auxiliary grain exit 39. In contrast, chaff, being of relatively low density, will tend to follow the auxiliary air flow stream to be exhausted.

The major portion of the liberated grain 46 slides along the trough 34 via the open end 36, which forms a main grain exit in the context of this embodiment, onto the transport means 122 of the second, cleaning apparatus 112.

It is believed that approximately 25% of the liberated grain exit the first apparatus 12 via the auxiliary grain exit 39, and the balance of about 75% via the main grain exit 36. This ratio is influenced by and can be adjusted by adjusting the velocity or speed of the airflow stream.

Furthermore, the heights of the baffles 27, 29 and thus their overlap, can be adjusted by replacing one or both of them with baffles having different lengths.

The second, cleaning apparatus 112 is similar to the first, threshing apparatus 12 and is not again described. Like reference numerals refer to like components or features. Reference numeral 118.1 indicates stirring bars or agitating bars in place of the beater bars 18.1.

Grain exiting the apertures via the main grain exit 36, is transported into the cleaning zone 116 by transport means 122. The grain exiting via the auxiliary grain exit 39 falls directly into the cleaning zone 116.

Cleaned grain 146 is discharged from the threshing apparatus 10 via an outlet 136 where the cleaned grain 146 is collected. Chaff is exhausted via the conduit 32 and 132.

If desired, a re-circulating grain exit may be provided in the trough 134 analogous to and in a position corresponding to the auxiliary grain exit. Products exiting such re-circulating grain exit can then be re-circulated or returned, either via the hopper 28 or via the transport means 122.

It is believed that in many applications, threshing by means of the first threshing apparatus 12 will provide adequately cleaned grain and that a second step, which will merely be a cleaning step, will not be required. Thus, in those applications, grain will be collected from the open end 36, and the products from the auxiliary grain exit 39 will be returned to or re-circulated to the hopper 28.

It is a first advantage that grain and chaff are separated already in the threshing zone 16. This is conducive to simplicity of design and effectiveness in operation. Transport of the liberated grain and chaff is facilitated and the threshing apparatus can be provided less expensively than comparable threshing apparatus of which the Applicant is aware.

It is further an advantage that the sieve 24 is stationary as it is operated by means of gravity and centrifugal forces, operating on the liberated grain.

It is a further advantage that the sieve 24 through which the liberated grain is passed is merely arcuate and not fully cylindrical. Provision of an arcuate or, in this case, semi-cylindrical sieve is adequate and allows a saving in cost.

The provision of the auxiliary grain exit 39 allows the intensity of the air flow stream to be greatly increased without aggravating loss of grain through the conduit 32. This enhances the cleaning action. This is especially advantageous with small or light grain such as wheat. It is believed that the provision of such an auxiliary grain exit 39, especially in association with the baffle downstream thereof and also the opposing baffle, allows the capacity of the apparatus to be increased substantially. With light and/or small grain kernels, the capacity can be increased by 100% or more in some applications. It is believed that such an improvement can be achieved because of the enhanced cleaning action because of the increased air flow stream intensity.

Figure 3:
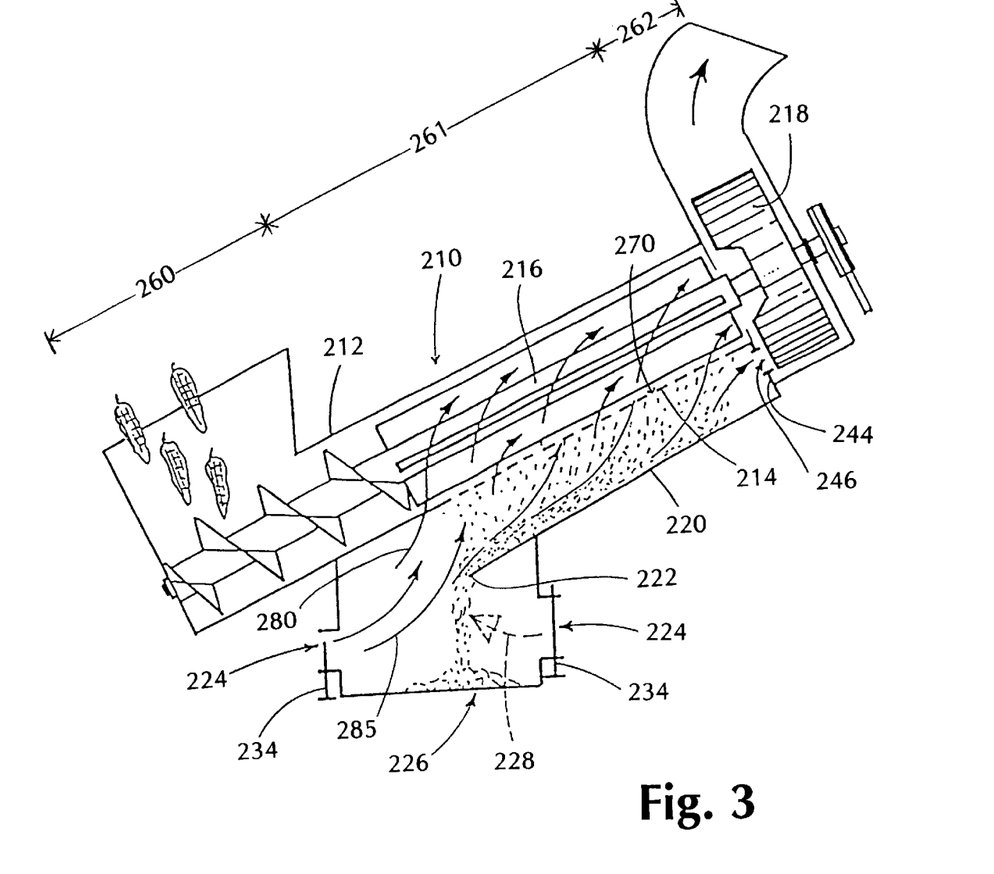
FIG. 3 is a side elevation of the first embodiment of the rotary threshing and separation unit.

Referring now to FIG. 3, there is shown a rotary threshing and separation unit 210. The rotary threshing and separation unit 210 threshes and cleans the grain; however, for simplification it is referred to as a rotary threshing and separation unit 210. It includes a rotor housing 212 with a feeding zone 260, separation zone 261 and discharge zone 262, sieve 214 is at least partially located in said separation zone 261, a rotary driven separation rotor 216 arranged in said housing 212, fan or blower 218 generating at least a main air flow stream moving at least through the separation zone 261 and the discharge zone 262, grain collecting element 220 arranged below the sieve 214. The zones, 260, 261, 262 along the length of a rotor housing 212 can be adapted and modified as required. The tools attached to the separation rotor 216 in the different zones 260, 261, 262 are selected according to the particular application. The harvested crop is fed into the feeding zone 260. By reason of simplicity, the feeding elements are not shown. For example, combine harvesters have a feeding element in the form of a feed rake arranged in a feeder housing, which receives, cut harvested crop from the cutterbar and distributes it towards the threshing elements. The separation rotor 216 beats the harvested crop and brings it into a rotational movement. Helical vanes (not shown) are arranged under the top of the rotor housing 212 for moving the crop forward and under rotational movement. Furthermore, the harvested crop in the rotary threshing and separation unit 210 is sucked towards the discharge zone 262 due to the main air flow stream generated by the fan or blower 218. The faster the rotational movement of the crop inside the rotor housing 212, the higher the centrifugal forces acting upon it. Under such conditions, the grain kernels tend to exit the rotor housing 212 through openings 270 in the sieve 214, whereas the chaff is too large to slip through the openings 270 in the sieve 214.

However, smaller particles, such as chaff, are small enough to fit through the openings 270 of the sieve 214 and exit the rotor housing 212 along with the grain kernels. Particles passing through the openings 270 in the sieve 214 must be separated from the grain kernels to achieve a clean sample of harvested grain. It is advantageous to preclude these particles from exiting the rotor housing 212 through the openings 270 because these particles occupy valuable cleaning capacity of the combine harvester. If such particles are precluded from exiting the rotor housing 212 through the openings 270 of the sieve 214, it is possible to eliminate a separate cleaning. As such, an air flow stream 280 through the openings 270 in the sieve 214 into the rotor housing 212 will force or carry the lighter particles of material like chaff with the air flow stream 280 into the center direction of the rotor housing 212. The air flow stream 280, however, will not have the same impact on the grain kernels. The grain kernels exiting the rotor housing 212 have a high degree of moving energy and the air flow stream 280 through the openings 270 in the sieve 214 will not substantially reduce the moving energy of the grain kernels. It is advantageous to have at least 10% of the total air volume being sucked through the rotor housing 212 entering from the openings 270 in the sieve 214. The air flow stream entering the rotary housing 212 from the openings 270 in the sieve 214 can reach up to 100% depending on the design of the combine harvester and the present working conditions. As such, the grain kernels will exit the rotor housing 212 in the openings 270 in the sieve 214 to the grain collecting element 220. By this, a first cleaning of the harvested crop is achieved. Whereas, the small particles of chaff are precluded from exiting the rotor housing 212 through the openings 270 of the sieve 214. Further, due to the continuous air flow stream 280 the openings 270 of the sieve 214 are kept clean because broken straw, chaff, debris and the like are kept away from same. The openings 270 in the sieve 214 are kept open for the passage of grain kernels.

Although forcing the air flow stream 280 through the openings 270 in the sieve 214 works well to preclude too much chaff from exiting the rotor housing 212, some particles of same may enter the space between the sieve 214 and the grain collecting element 220. If the grain kernels are still quite humid, chaff sticks to the grain kernels and the air flow stream at the openings 270 of the sieve 214 will not be sufficient for a total cleaning. Furthermore, if the throughput capacity of the rotary threshing and separation unit 210 is fully utilized, there is not much space left inside of the rotor housing 212 and the air flow stream 280 may not be sufficient. Under humid conditions and high utilization, it is important that the air flow stream 280 flowing between the sieve 214 and the grain collecting element 220 be used for further separation and cleaning. This can be achieved by a useful arrangement of passages 224 through which an air flow stream is directed into the space between the sieve 214 and the grain collecting element 220. If such passages 224 are arranged upstream of the direction of the air flow stream, there is a longer distance along which the air flow stream flows in counter or cross direction with respect to the direction of the grain kernels which is effective for cleaning purposes. Such passages 224 can be arranged anywhere around the side walls of the space between the sieve 214 and grain collecting element 220, and an air flow stream can also be passed through the grain exit to a further cleaning device or grain storage device. The space between the sieve 214 and grain collecting element 220 is less congested than in the rotor housing 212, hence a separation and cleaning of grain from chaff is readily achieved by the air flow stream.

The grain collecting element 220 directs the grain kernels towards a further cleaning process and storage grain bin 226. If the grain collecting element 220 is arranged inclined towards the ground in the machine, similar to a trough arranged underneath the rotor housing 212, the grain kernels move along the surface of the grain collecting element 220 by gravitational forces. The grain collecting element 220 can also be driven in oscillating movements, as this is known for grain pans in combine harvesters, or it can comprise a driven conveying belt. This would be beneficial, if the grain collecting element 220 is arranged substantially horizontal within a machine. The grain collecting element 220 directs the grain kernels toward a discharge end 222. At the discharge end 222, the grain kernels fall through the air into the grain bin 226 where the pre-cleaned grain is distributed away for further cleaning and storing. The distance the grain kernels fall from the discharged end 222 to the grain bin 226 is used for separating and cleaning purposes. This is achieved by passing an air flow stream 228 from passages 224 through the falling grain kernels between the discharge end 222 and grain bin 226. Further, the separated chaff is carried by an air flow stream 285 away from the grain kernels falling to the grain bin 226.

Figure 4:
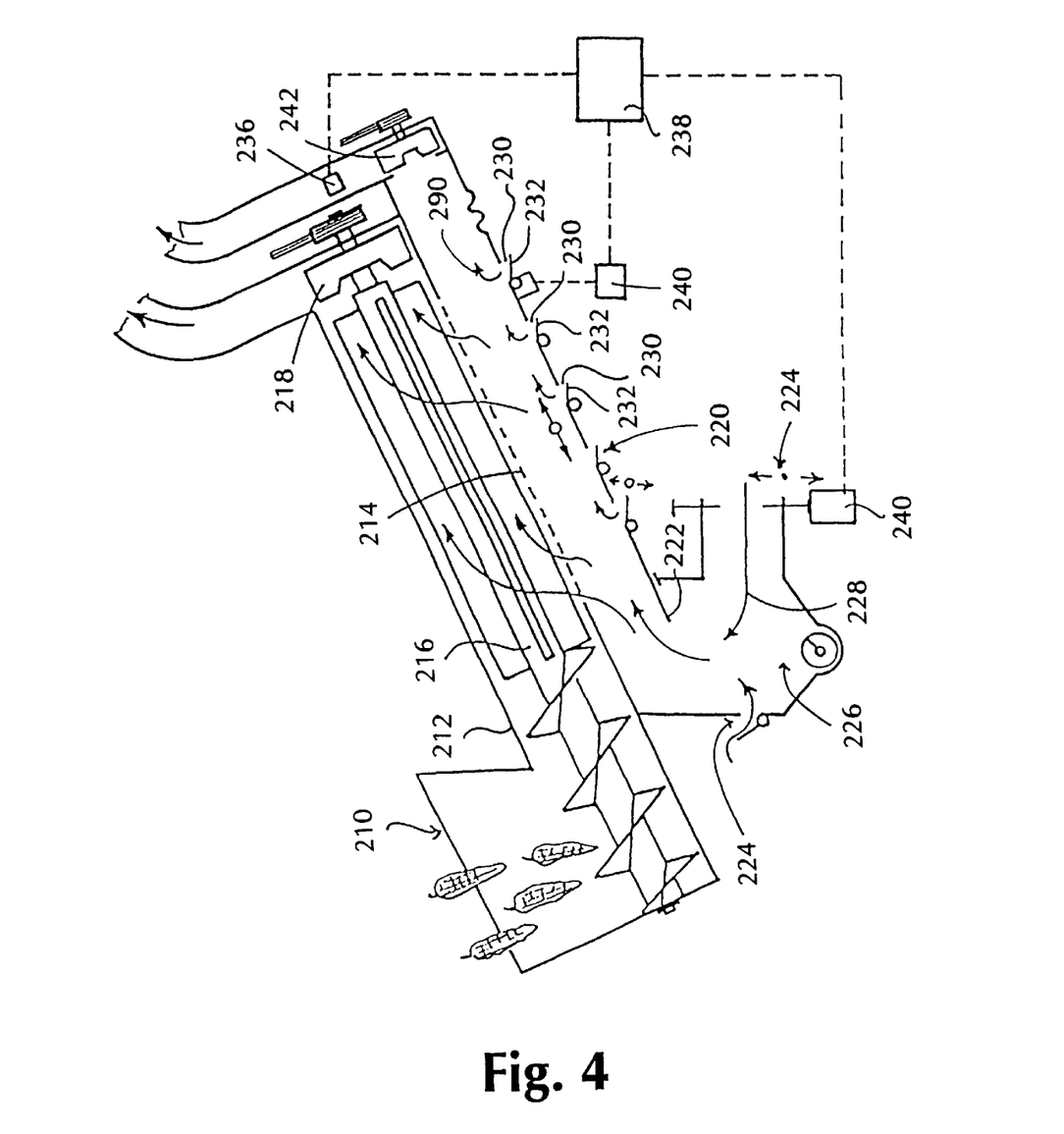
FIG. 4 is a side elevation of the second embodiment of the rotary threshing and separation unit.

Referring now to FIG. 4, in the grain collecting element 220 has orifices 230 which allow an air flow stream 290 to pass. This air flow stream 290 is passed through the grain kernels traveling along the grain collecting element 220 below the sieve 214. By this, the air flow stream 290 is passed through the grain kernels mixed with chaff and separates and cleans the grain kernels from the chaff.

The air flow stream 290 velocity is adjustable according to the working conditions. The widths of the orifices 224, 230 are adjusted, for example, by flaps 232. Adjustments are necessary due to the different types of crops to be separated the level of chaff, throughput, humidity or other influencing factors. By adjusting the widths of the orifices 224, 230 via the flaps 232, an operator can control and influence the separating and cleaning function from inside the cab of the harvester. This adjustment can also be achieved or combined with the adjustment of the fan or blower 218 so that the speed of the air flow stream is variable.

Further, the adjustment can be combined with a grain loss sensor 236, which is located in an appropriate position to measure grain losses. The grain loss is transferred to a computer 238 that automates the adjustments. Powered drives 240 are used to control flaps 232. The adjustment to the settings of flaps 232 and the rotational speeds and throughput of the fan or blower 218 on the go. This system then achieves a working performance, which is very close to the theoretical performance of the rotary threshing and separation unit 210.

Referring now to FIG. 4, there is shown an auxiliary air flow stream generating means 242. The auxiliary air flow stream generating means 242 supports the fan and blower 218 by passing an auxiliary air flow stream through the space between the sieve 214 and grain collecting element 220. This is beneficial when the rotor housing 212 is loaded with harvested crop close to its maximum capacity.

Referring now to FIG. 3, it is important that there are stopping means to preclude the grain kernels from being discharged from the rotary threshing and separation unit 210. The location of the stopping means is at the downstream end of the air flow stream in the rotor housing 212 or just prior to the fan or blower 218 because the air flow stream reaches its highest speed there. Otherwise, there might be excessive grain losses because grain kernels might get sucked out of the rotor housing 212 or the space between the sieve 214 and grain collecting element 220. The stopping means attach to the downstream end of the rotor housing 212 and could be helical vanes, whose effective front side is directed reversely against the axial feeding direction inside of the rotor housing 212. The stopping means attached to the grain element 220 could be a transversely arranged baffle plate 244 which leaves a clearance 246 between the top of the baffle plate 244 and the rotor housing 212 or the sieve 214 respectively. The clearance 246 should be wide enough to allow chaff to exit the space between sieve 214 and grain collecting element 220. This is achieved by setting the clearance 246 between 10 and 50 millimeters, but most preferably about 25 millimeters.

While the preferred structure in which the principles of the present invention have been incorporated is shown and described above, it is to be understood that the invention is not to be limited to the particular details thus presented, but in fact, widely different means may be employed in the practice of the broader aspects of this invention. The described separation unit may be integrated into a stationary, pull-type or self-propelled combine harvester. It may be arranged inclined or horizontally, and it may be combined with any kind of cleaning technology known from the prior art. The scope of the appended claims is intended to encompass all obvious changes in the details, materials and arrangements of parts, which will occur to one skilled in the art upon a reading of the disclosure.

What is claimed is:

1. A rotary threshing and separation unit for grain harvesting, comprising:
    a housing;
    means for receiving harvested crop and defining a feeding zone;
    a rotary driven threshing and separation rotor arranged in said housing and therewith defining a separation zone;
    a transport mechanism for transporting the harvested crop from the feeding zone to the separation zone;
    means operatively connected to the separation zone for exhausting chaff and defining a discharge zone;
    a sieve located at least partially within the separation zone;
    a grain collecting element arranged below the sieve;
    a fan for generating an air flow stream from at least the separation zone to the discharge zone; and
    at least one passage into the housing that communicates with a space between the sieve and grain collecting elements and wherein at least part of the air flow stream is generated from the passage and through the space between the sieve and grain collecting elements towards the fan.

2. A rotary threshing and separation unit according to claim 1, wherein the passages are arranged so that the air flow stream flows in substantially a cross or counter flow direction to that of the grain kernels falling between the sieve and grain collecting element.

3. A rotary threshing and separation unit according to claim 2, further including:
    a grain bin located below the grain collecting element for catching and storing grain kernels, wherein the grain kernels falling from the grain collecting element to the grain bin are subjected to a plurality of air flow streams which are traverse to the grain kernels path of travel, wherein the air flow streams are directed opposite each other.

4. A rotary threshing and separation unit according to claim 2, further including:
    orifices in the grain collecting element for allowing an air flow stream to enter the space between the sieve and the grain collecting element.

5. A rotary threshing and separation unit according to claim 3, further including:
    flaps operatively connected to the grain collecting element, wherein widths of the orifices are manually or drivingly adjustable by the flaps.

6. A rotary threshing and separation unit according to claim 5, further including:
    at least one drive for controlling the flaps, wherein the flaps control the widths of the orifices;
    a grain loss sensor for sensing grain kernel losses at the discharge zone of the rotor housing;
    an electronic controller electronically connected to the grain loss sensor, wherein the grain loss sensor electronically transmits sensor signals to the electronic controller that computes a setting value for setting the drives of the flaps, wherein the width of the orifices are automatically adjusted by the at least one drive according to the setting value.

7. A rotary threshing and separation unit according to claim 1, wherein the fan is adjustable and variable to increase or decrease rotational speed of the fan.

8. A rotary threshing and separation unit according to claim 1, further including:
    a stopping means for precluding grain kernels traveling along the grain collecting element from the separation zone towards the discharge zone from being discharged from the rotary threshing and separation unit.

9. A rotary threshing and separation unit according to claim 1, further including:
    a baffle plate located between the rotor housing and the grain collecting element at the discharge zone prior to the fan, wherein the baffle plate is adjustable in height so that by adjusting the height of the baffle also varies clearance between the baffle plate and the rotor housing; and
    wherein the clearance between the top of the baffle plate and the rotor housing is between 10 millimeters and 50 millimeters.

10. A rotary threshing and separation unit according to claim 1, further including:
    helical vanes directed opposite a feeding direction for the harvested crop;
    wherein the helical vanes are located in the separation zone substantially towards the discharge zone.

11. A rotary threshing and separation unit for grain harvesting, comprising:
    a housing;
    means for receiving harvested crop and defining a feeding zone;
    a rotary driven, threshing and separation rotor arranged in said housing and therewith defining a separation zone;
    a transport mechanism for transporting the harvested crop from the feeding zone to the separation zone;
    means operatively connected to the separation zone for exhausting chaff and defining a discharge zone;
    a sieve located at least partially within the separation zone;
    a grain collecting element arranged below the sieve;
    a main fan for generating a main air flow stream from at least the separation zone to the discharge zone, wherein at least part of the air flow stream is generated between the sieve and grain collecting element towards the fan;
    an auxiliary fan for generating an auxiliary air flow stream between the sieve and grain collecting element;
    at least one opening in the housing that is operatively connected with the space between the sieve and grain collecting elements and wherein at least part of the air flow stream flows through the opening and through the space between the sieve and grain collecting elements towards the fan; and
    wherein the at least one opening is arranged so that the air flow stream flows in substantially a cross or counter flow direction to that of the grain falling between the sieve and grain collecting element.

12. A rotary threshing and separation unit according to claim 11, wherein the main air flow stream and the auxiliary air flow stream are provided by the same fan.

13. A rotary threshing and separation unit according to claim 11, further including:
    a grain bin located below the grain collecting element for catching and storing grain kernels, wherein the grain kernels falling from the grain collecting element to the grain bin are subjected to a plurality of air flow streams which are traverse to the grain kernels path of travel, wherein the air flow streams are directed opposite each other.

14. A rotary threshing and separation unit according to claim 11, further including:

orifices having adjustable widths in the grain collecting element for allowing an air flow stream to enter the space between the sieve and the grain collecting element.

15. A rotary threshing and separation unit according to claim 11, further including:

flaps operatively connected to the grain collecting element, and wherein widths of the orifices are manually or drivingly adjustable by the flaps.

16. A rotary threshing and separation unit according to claim 11, further including:

at least one drive for controlling the flaps so that the flaps control the width of the orifices;

a grain loss sensor for sensing grain kernel losses at the discharge zone of the rotor housing;

an electronic controller electronically connected to the grain loss sensor, wherein the grain loss sensor electronically transmits sensor signals to the electronic controller, which computes a setting value for setting the drives of the flaps, wherein the width of the orifices are automatically adjusted by the drives according to the setting value.

17. A rotary threshing and separation unit according to claim 11, wherein the main and auxiliary fans are adjustable and variable to increase or decrease rotational speed of the main and the auxiliary fans.

18. A rotary threshing and separation unit according to claim 11, further including a stopping means for precluding grain kernels traveling along the grain collecting element from the separation zone towards the discharge zone from being discharged from the rotary threshing and separation unit.

19. A rotary threshing and separation unit according to claim 11, further including:

a baffle plate located between the rotor housing and the grain collecting element at the discharge zone prior to the fan, wherein the baffle plate is adjustable in height so that adjusting the height of the baffle also varies the clearance between the baffle plate and rotor housing, wherein the clearance between top of the baffle plate and the rotor housing is between 10 mm and 50 mm.

20. A threshing and separation unit according to claim 11, further including helical vanes directed opposite the feeding direction, wherein the helical vanes are located in the separation zone substantially towards the discharge zone.

* * * * *